United States Patent [19]

Shirakawa et al.

[11] Patent Number: 4,733,390
[45] Date of Patent: Mar. 22, 1988

[54] DATA TRANSMISSION SYSTEM

[75] Inventors: Masakazu Shirakawa; Hiroyuki Hasegawa, both of Tokyo, Japan

[73] Assignee: Kabushiki Kaisha Toshiba, Kawasaki, Japan

[21] Appl. No.: 904,677

[22] Filed: Sep. 8, 1986

[30] Foreign Application Priority Data

Sep. 13, 1985 [JP] Japan .................. 60-201574

[51] Int. Cl.⁴ .................................................. H04J 3/02
[52] U.S. Cl. ...................................... 370/85; 370/95; 340/825.5
[58] Field of Search ................ 370/85, 95, 86, 89, 370/88; 340/825.5

[56] References Cited

U.S. PATENT DOCUMENTS

| | | | |
|---|---|---|---|
| 4,488,290 | 12/1984 | Dunn et al. | 370/66 |
| 4,631,534 | 12/1986 | Franklin et al. | 340/825.5 |
| 4,656,627 | 4/1987 | Hasley et al. | 370/85 |

Primary Examiner—Douglas W. Olms
Assistant Examiner—Wellington Chin
Attorney, Agent, or Firm—Oblon, Fisher, Spivak, McClelland & Maier

[57] ABSTRACT

A data transmission system in which a plurality of data transmitting circuits with different addresses allotted thereto and a common data receiving circuit are coupled to one another through common data transmission lines. A clock pulse signal determining the rate of data transmission and a frame sync signal determining one frame period having a plurality of time slots are transmitted to the common data transmission lines. The plurality of data transmission circuits are each given a right to transmit data in a plurality of time slots according to a predetermined priority. Each data transmitting circuit is allowed to transmit data in time slots other than a time slot in which a first priority is assigned to itself, after confirming that no data is being transmitted to the common data transmission line by other data transmitting circuits with a priority higher than its priority.

6 Claims, 21 Drawing Figures

| i \ k | 0~(j-1) | j~(2j-1) | 2j~(3j-1) | ---- ---- | (m-2)j ~(m-1)j-1 |
|---|---|---|---|---|---|
| 0~(j-1) | 1 | m | m-1 | ------ | 2 |
| j~(2j-1) | 2 | 1 | m | ------ | 3 |
| 2j~(3j-1) | 3 | 2 | 1 | ------ | 4 |
| ⋮ | ⋮ | ⋮ | ⋮ | ⋮ | |
| (m-2)j ~{(m-1)j-1} | m | m-1 | m-2 | ------ | 1 |

DATA TRANSMISSION SYSTEM

BACKGROUND OF THE INVENTION

This invention relates to a private branch exchange (PBX) used for information exchange between terminals such as telephone sets and, more particularly, to a data transmission system which can be suitably used for such a PBX.

As an example of the PBX, a distributed control type private branch exchange is well known in the art. In this exchange, a plurality of line/trunk modules (or shelves) and a common control module are packed into a case. Each line/trunk module has a plurality of line/trunk cards, and a plurality of telephone sets or data terminals are coupled to each line/trunk card. The common control module has local central processor unit (LCPU) cards corresponding to the respective line/trunk modules, a main central processor unit (MCPU) card and a time switch (TSW) card. The line/trunk cards of each line/trunk module are coupled to the corresponding LCPU card in the common control module through a control data highway and also coupled to the TSW card through a PCM highway. The TSW card is used for switching voice data from line/trunk cards through PCM highways. Each LCPU effects communication of control data with the line/trunk cards of the corresponding line/trunk module through the control highway. The line/trunk card is provided for each of different kinds of terminals such as standard telephone sets and digital telephone sets.

In general, with this system, a LCPU card is arranged to transmit control data to each of corresponding N line/trunk cards through the control data highway in synchronism with a transition between time slots within one frame period of time. Each of the N line/trunk cards, on the other hand, is arranged to transmit control data to the LCPU card through the control data highway only in a time slot allocated thereto in one frame period of time.

The transmission of data from the N line/trunk cards to the LCPU through a common transmission line requires prevention and detection of collision of data on the transmission line. When a line/trunk card transmits a signal in the allocated time slot as described above, it is possible to prevent collision of signals using a simple construction. In this case, however, the efficiency of the transmission line is reduced.

In a case where collision of signals is permitted, the efficiency of the transmission line is increased. In this case, however, a complicated processing such as the detection of collision and retransmission control of signals is required. This is disadvantageous from the standpoints of the reliability and cost of the system.

Heretofore, telephone sets having a simple function have been utilized as terminals of an exchange system. Therefore, greater attention has been paid to the reliability and cost rather than to the transmission efficiency. It is forecast that mulit-function telephone sets and data terminals will be increasingly utilized as terminals of the exchange system. The utility of such terminals necessitates an increased transmission capacity. However, merely increasing a transmission speed for the increased transmission capacity will increase not only the difficulty in the system design but also the cost and power dissipation. The utilization of a collision detection system would cause, on the other hand, a problem in the reliability and the cost of the system as mentioned above.

SUMMARY OF THE INVENTION

An object of the invention is to provide an improved data transmission system, which improves the transmission efficiency of a transmission line.

Another object of the invention is to provide a data transmission system comprising a plurality of data transmission circuits coupled to a common data reception circuit through a common transmission line, in which each data transmission circuit is entitled to transmit data in a plurality of time slots while avoiding collision of signals on the common transmission line.

According to the invention, there is provided a data transmission system, which comprises a plurality of data transmission circuit means with different addresses allotted thereto, common data receiving circuit means, and common data transmission line means for coupling the plurality of data transmitting circuit means and common data receiving circuit means, the common data transmission line means including a first transmission line, through which a clock pulse signal determining the rate of data transmission is transmitted, a second transmission line, through which a frame sync signal determining one frame period having a plurality of time slots and synchronized to the clock pulse signal is transmitted, and a third transmission line, through which a data signal from each of the data transmitting circuit means is transmitted, the plurality of data transmitting circuit means each being given a right to transmit data to the third transmission line with a first priority in a time slot corresponding to its own allotted address in one frame period and transmit data to the third transmission line with a priority of a lower order than the first priority in the other time slots in response to the clock pulse signal, a frame sync signal, and its own allotted address and transmitting data after confirming that no data is being transmitted by data transmitting circuit means having a priority of a higher order than its own priority in a time slot, in which it is given a priority of a lower order than the first priority.

DETAILED DESCRIPTION OF THE PREFERRED EMBODIMENT

Figure 1:
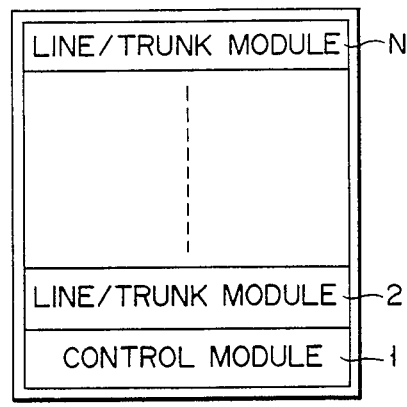
FIG. 1 shows an arrangement of a distributed control type private branch exchange system adopting a control data transmission system according to the invention.

Referring to FIG. 1, a distributed control type private branch exchange system comprises stacked modules 1 to N. Module 1 is a common control module, into which are packed a main CPU (MCPU) card programmed to execute exchange processing and maintenance, a plurality of local CPU (LCPU) cards for decoding a command issued from the MCPU and convert it into control data corresponding to the kind of used terminal and a time switch (TSW) card for executing inter-terminal data exchange processing. Modules 3 to N are line/trunk modules. To each of line/trunk modules are coupled standard telephone sets, digital multi-function telephone sets, data terminals or the like.

Figure 2:
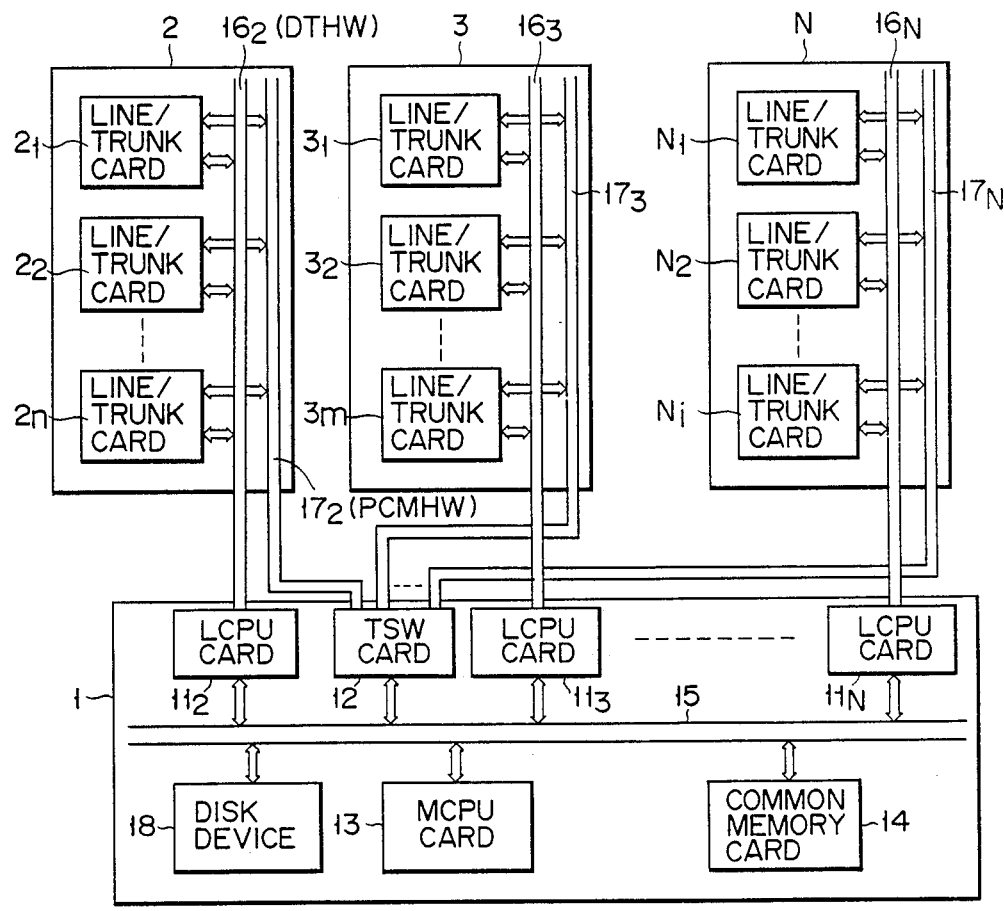
FIG. 2 is a block diagram of the exchange shown in FIG. 1.

FIG. 2 is a block diagram of modules 1 to N of FIG. 1. Line/trunk module 2 comprises line/trunk cards $2_1$ to $2_n$, line/trunk module 3 comprises line/trunk cards $3_1$ to $3_m$, and module N comprises line/trunk cards $N_1$ to $N_i$. To each line/trunk card are coupled a plurality of terminals of the same type (e.g., standard telephone sets or digital telephone sets).

Common control module 1 comprises LCPU cards $11_2$ to $11_N$ corresponding to respective line/trunk modules 2 to N, TSW card 12, MCPU card 13, common memory card 14 and floppy disk (hard disk) device 18. LCPU cards $11_2$ to $11_N$, TSW card 12, MCPU card 13, common memory card 14 and disk device 18 are interconnected through a common bus (e.g., IEEE796) 15. Line/trunk cards $2_1$ to $2_n$ of module 2 are coupled to corresponding LCPU card $11_2$ through common control data highway (DTHW) $16_2$, and are also coupled to TSW card 12 though a common PCM highway (PCMHW) $17_2$. Likewise, module 3 is coupled to corresponding LCPU card $11_3$ through a common control highway $16_3$ and also coupled to TSW card 12 through a common PCM highway $17_3$. Module N is coupled to LCPU card $11_N$ through a common control highway $16_N$ and also coupled to TSW card 12 through a common PCM highway $17_N$. Transmission of control data between each line/trunk module and common control module is effected in a serial form through the control data highway. Communication data such as voice information is transmitted in the serial form through the PCM highway.

To each line/trunk card are coupled a plurality of data terminals of the same type, i.e., standard telephone sets or digital telephone sets.

Figure 3:
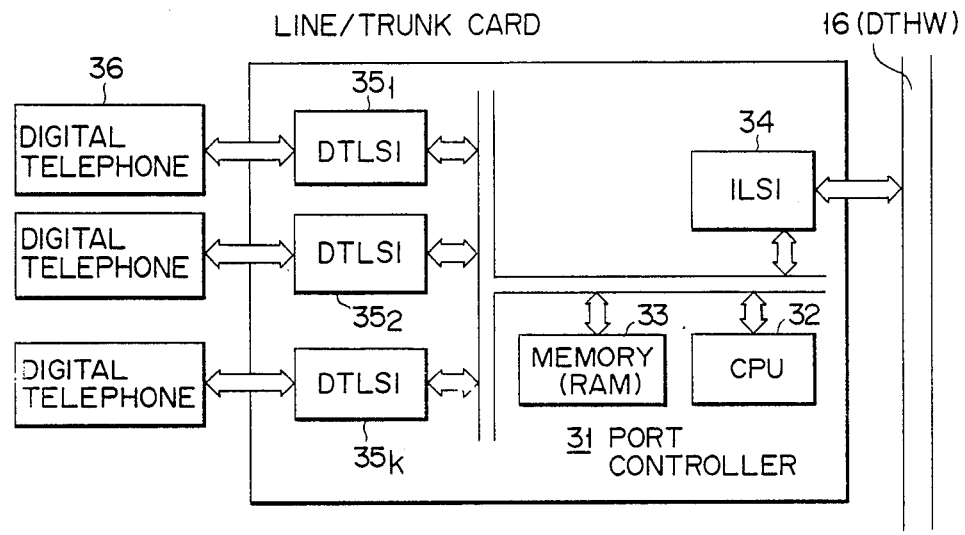
FIG. 3 is a block diagram of a line/trunk card.

FIG. 3 is a block diagram of a line/trunk card for a telephone set according to the invention. According to the invention, the line/trunk card has a port controller (PC) 31, which consists of CPU 32 and RAM 33. The line/trunk card further has an interface large scale integrated circuit (ILSI) 34, which is connected to a corresponding LCPU card through the control highway.

The line/trunk card, like an existing line/trunk card, has a plurality of digital telephone LSIs (DTLSIs) $35_1$ to $35_K$. Digital telephone set 36 is coupled to an output port of each DTLSI through four lines (two lines for voice data transmission and two lines for control code transmission). ILSI 34 effects a communication with a corresponding LCPU card through the control highway. DTLSI 35 controls communication between port controller 31 and digital telephone set 36. As will be described later, control data and programs for controlling telephone sets and trunks are loaded into RAM 33 of each line/trunk card through the control data highway and ILSI 34.

Figure 4:
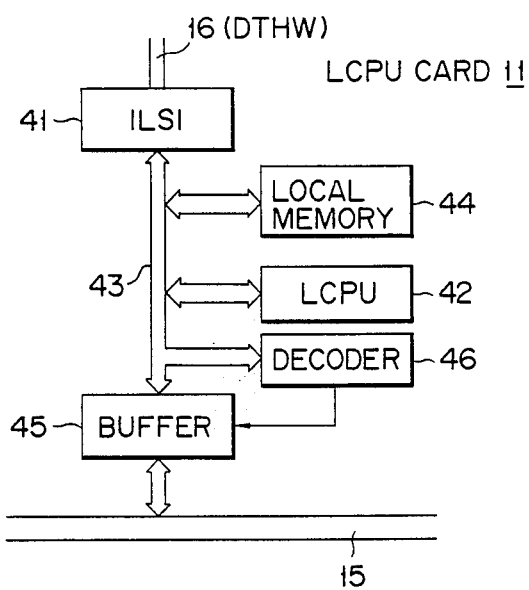
FIG. 4 is a block diagram of a LCPU card.

FIG. 4 is a block diagram of each of LCPU cards $11_1$ to $11_N$ in common control module 1. Reference numeral 41 denotes an interface LSI having the same construction as ILSI 33 shown in FIG. 3, which is connected to the ILSI of each line/trunk card through control highway 16. LCPU 42 is connected to ILSI 41 through local bus 43 to control ILSI 41. Local memory 44, in which programs and data for operating LCPU 42 are stored, is connected to local bus 43. These programs and data are loaded from disk device 18 shown in FIG. 1. LCPU 42 is connected to common bus 15 via buffer 45. To local memory 44 and common memory card 14 are allotted different addresses. When LCPU 42 accesses common memory card 14, address decoder 46 detects an address allotted to the common memory card, whereby buffer 45 is enabled to couple local bus 43 to common bus 15. As a result, LCPU 42 accesses common memory card 14.

Figure 5:
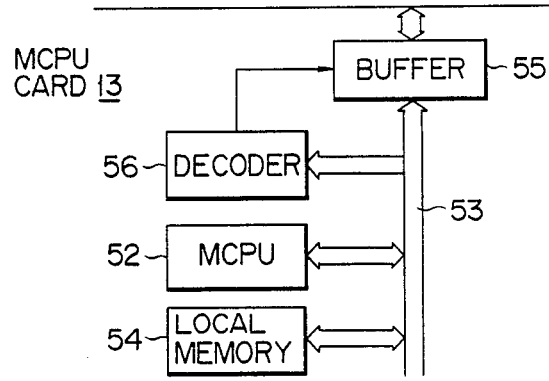
FIG. 5 is a block diagram of a MCPU card.

FIG. 5 shows a block diagram of MCPU card 13. This card has the same construction as LCPU card shown in FIG. 4 and comprises MCPU 52, local bus 53, local memory 54, buffer 55 and address decoder 56.

Figure 6:
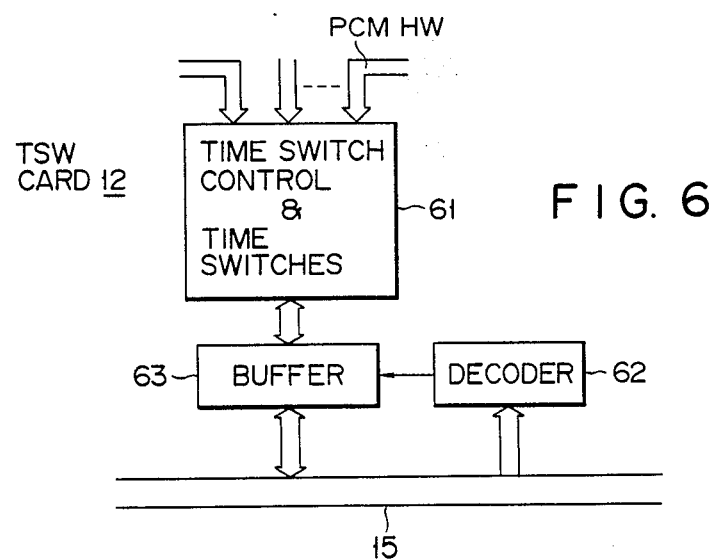
FIG. 6 is a block diagram of a TSW card.

FIG. 6 shows a block diagram of TSW card 12. The TSW card has time switches and time switch control unit 61 connected to the PCM highways. The unit effects a processing of exchange of communication data between data terminals under control of MCPU card 13. Address decoder 62 connected to common bus 15 detects an access to unit 61 to enable buffer 63, thus connecting unit 61 to common bus 15.

Figure 7:
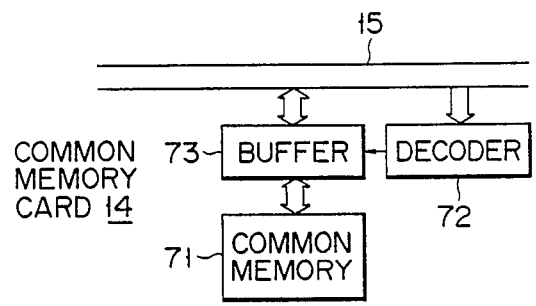
FIG. 7 is a block diagram of a common memory card.

FIG. 7 is a block diagram of common memory card 14. Common memory 71 is accessed from MCPU 13 and LCPU card $11_2$ to $11_N$. When address decoder 72 connected to common bus 15 detects an access to common memory 71, buffer 73 is enabled to connect common memory 71 to common bus 15.

Now, data transmissions within common control module 1 will be described. The data transmissions include one, in which each LCPU card sends data representing the terminal states and also calling control requests, e.g., dial digit information and key information of an electronic key telephone set collected from line/trunk cards to MCPU card 13, and one, in which MCPU card 13 sends terminal control data resulting from exchange processing, e.g., data resulting from signal transmission, reception acceptance, communication end confirmation, etc., to a LCPU card.

These data transmissions are effected through common memory 14, which can be commonly accessed from each CPU of common control module 1 through common bus 15. Further, every time the state of each terminal is changed (e.g., a telephone handset is raised or lowered) or when dial data is received, each LCPU writes the corresponding data in common memory 14. MCPU card 13 periodically polls common memory 14 to detect a change in terminal states. For example, when a calling takes place in a terminal, MCPU 13 detects the data indicative of calling in common memory 14 to call the terminal. When MCPU 13 necessitates data stored in common memory 14 or data written in the common memory from a terminal through an LCPU during a series of routines of the calling processing, MCPU 13 accesses common memory 14. If a change occurs in data for controlling a terminal as a result of the processing, the changed control data is written in common memory 14. Each LCPU also periodically polls common memory 14 to detect a change in terminal control data and also the content of new data.

A copending U.S. patent application Ser. No. 902,876 filed on Sept. 2, 1986, entitled "CONTROL DATA TRANSMISSION SYSTEM FOR PRIVATE BRANCH EXCHANGE" and assigned to the same assignee as this application discloses an improved transmission system for transmission of control data and programs from a LCPU card to line/trunk cards in a private branch exchange as noted above. In an embodiment disclosed in this copending application, the operation mode of the ILSI of LCPU and ILSIs of line/trunk cards is switched from a master mode to a slave move according to an externally supplied control signal. The ILSI of the LCPU card operates in the master mode, while the ILSIs of the line/trunk cards operate in the slave mode. In the master mode, control data is sent to the line/trunk cards in synchronism with a transition between time slots in one frame period. On the other hand, the ILSI of each line/trunk card sends out data only in an externally designated time slot. Terminals of a specific type are connected to each line/trunk card. For example, only digital telephone sets are connected to one line/trunk card, while only standard telephone sets are connected to another line/trunk card. The control data and programs differ for each type of terminals. Such control data and programs have to be loaded in each line/trunk card from a disk device of a common control module. The invention of the above copending application is characterized in that common control data and programs are collectively loaded from the common control module into a group consisting of a plurality of line/trunk cards, to which terminals of the same type, e.g., digital telephone sets or standard telephone sets, are connected. To this end, to each of ILSIs of the line/trunk cards is allotted its own LSI address and a group address of a group to which it belongs.

The present invention, unlike the case of the copending application, is directed to a data transmission system for transmitting data from a plurality of slave ILSIs to a master ILSI. The gist of the invention resides in that a plurality of slave ILSIs are capable of accessing a common master ILSI in one time slot, these slave ILSIs are given respective priorities of accessing the master ILSI in the time slot to avoid collision of signals, and an ILSI of a lower priority is arranged to transmit data after confirming that the ILSIs of higher priorities are not transmitting data.

Figure 8:
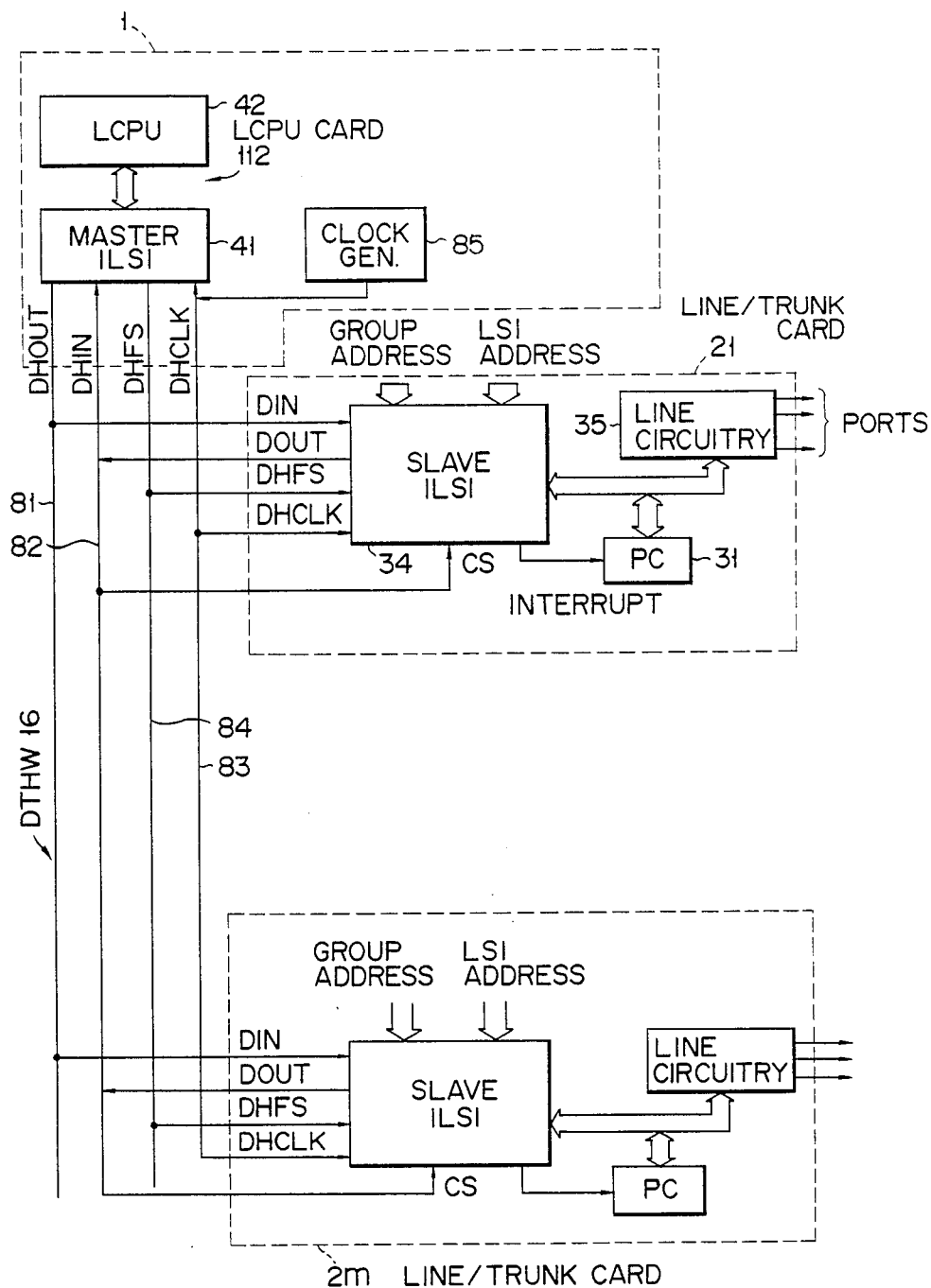
FIG. 8 is a diagram for explaining the control data transmission system according to the invention.

FIG. 8 typically shows LCPU card $11_2$ and line/trunk module 2 shown in FIG. 2. LCPU card $11_2$ has LCPU 42 and master ILSI 41 which operates in the master mode. Line/trunk card 21 comprises slave ILSI 34, port controller 31 and line circuitry 35. Other line/trunk cards $2_2$ to $2_m$ have the same arrangement. Line circuitry 35 corresponds to LSIs $35_1$ to $35_k$ for digital telephone sets. The ILSI in each line/trunk card operates in the slave mode in the data transmission as mentioned above. ILSIs 41 and 34 each consist of an LSI having the same configuration, and their operation mode is switched according to an externally supplied mode designation signal to be described later. Hereinafter, description is made of a case where the terminals are digital telephone sets.

Control data highway (DTHW) $16_2$ has data output line 81, through which control data from master ILSI 41 is transmitted to the slave ILSI of each line/trunk card, data input line 82, through which control data is transmitted from each slave ILSI to master ILSI 41, clock signal line 83, through which clock signal CLK from clock generator 85 is supplied to the master and slave ILSIs, and frame sync signal line 84, through which frame sync signal DHFS generated from master ILSI 41 in response to the clock signal and defining one frame period is supplied to each slave ILSI. Data line 82 is connected to carrier sense terminal CS of each slave ILSI.

Master ILSI 41 sends out data to data line 81 in synchronism with a transition of time slots in one frame period, and receives data from each slave ILSI in response to the detection of a header of data on data line 82. Master ILSI causes LCPU 42 to effect an interruption for reception request in response to the reception of data.

In each slave ILSI data reception is made upon detection of coincidence of address information following the header and its own address (LSI address), and port controller 31 is interrupted for data reception request. In response to the data reception request, port controller 31 reads out received data from a receiving register, to be described later, of the slave ILSI and writes the read-out data in a corresponding digital telephone set LSI in line circuitry 35. Port controller 31 fetches data from line circuitry 35 and writes it in a transmitting register, to be described later, in slave ILSI 34. Subsequently, the slave ILSI sends out data from the transmitting register to data line 82 in a designated time slot.

Figure 9:
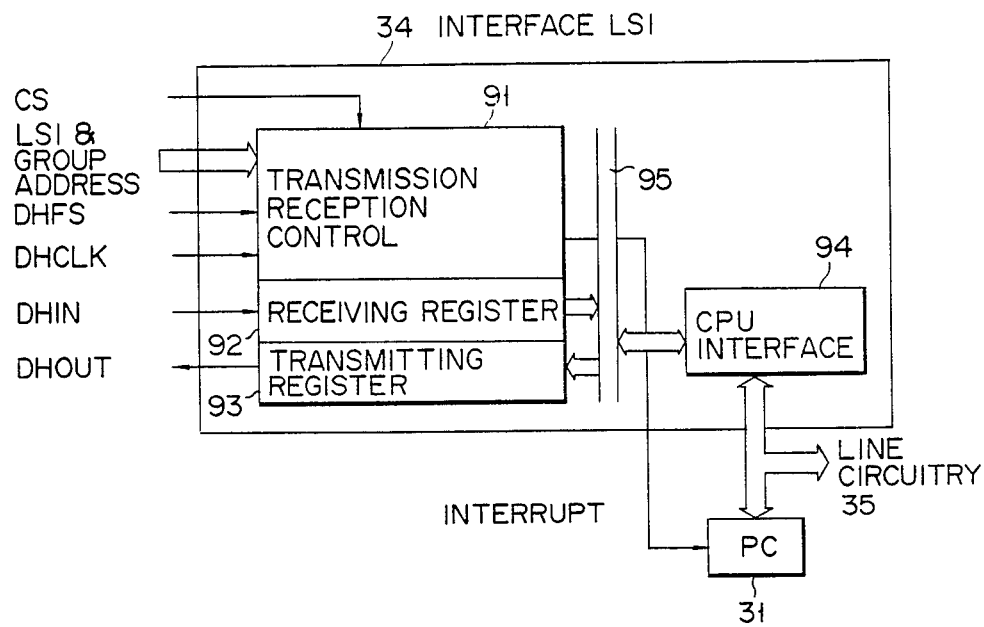
FIG. 9 shows an arrangement of an interface LSI of line/trunk card.

FIG. 9 schematically shows an arrangement of ILSI 34 adapted for digital telephone sets. ILSI 34 comprises transmission/reception control circuit 91 responsive to an address input peculiar to each ILSI, a group address input common to a plurality of LSIs to which terminals of the same type are coupled, frame sync signal DHFS and control data highway clock signal DHCLK, both the address inputs being supplied from back side wirings of the LSI. The ILSI also comprises receiving register 92 for receiving control data transmitted over data line 81, a transmitting register 93 for sending out control data to data line 82, CPU interface 94 and bus 95 connecting transmitting and receiving registers 92 and 93 to interface 94. When the address field in the control data received in receiving register 92 represents LSI address information allotted to the LSI, group address information representing the group to which the LSI belongs or general addressing information, transmission/reception control circuit 91 issues an interruption signal to port controller 31. In response to this signal, port controller 31 receives data a in control field and a control data field received through interface 94.

Figure 10:
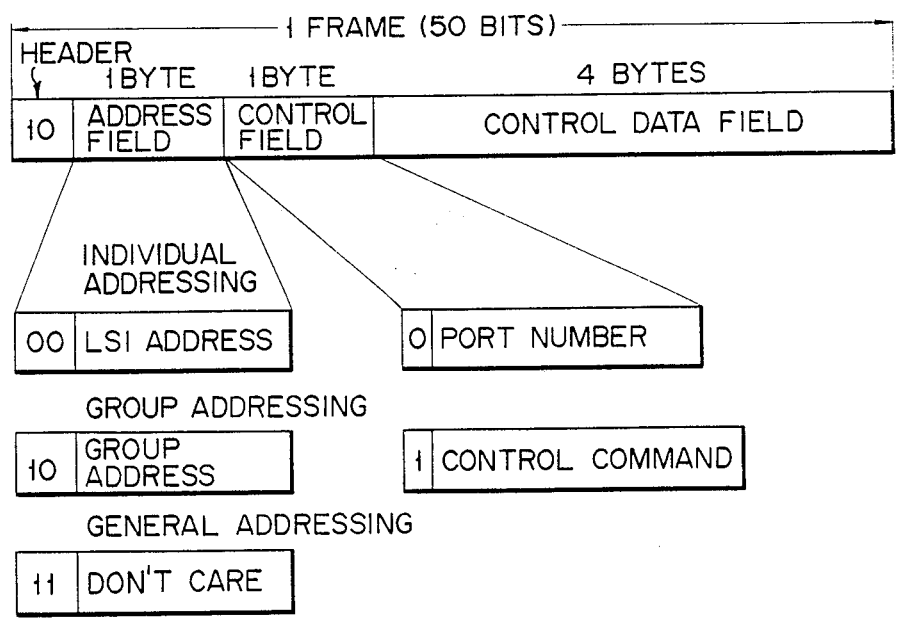
FIG. 10 shows a format of control data.

FIG. 10 shows a format of control data which is transmitted over the control data highway DTHW. The control data is transmitted in units of one frame consisting of 50 bits. As shown, one frame consists of a 2-bit header, a one-byte (i.e., 8-bit) address field, a one-byte control field and a 4-byte control data field. The header has bits "10", which indicate the start of control data transmitted over the control highway. The address field has MSB 2-bit addressing discrimination data for discriminating individual addressing, group addressing and general addressing. As is shown, discrimination data "00" represents the individual addressing, and it is followed by 6-bit LSI address data starting with "0". Discrimination data "10" represents the group addressing, and it is followed by 6-bit address data starting with "0". Discrimination data "11" represents the general addressing. In this case, all the ILSIs unconditionally receive the same control data. In the control field, MSB of "0" is followed by port No. data, which represents a LSI number of DILSIs $35_1$ to $35_k$ shown in FIG. 3. If MSB is "1", it is followed by a control command. The control command may include a control code representing a trouble in the card, resetting of CPU, collective or individual down-loading of a program from the control module to a line/trunk card, etc. The first byte represents the type of control, and the following three bytes represent control parameters.

Figure 11:
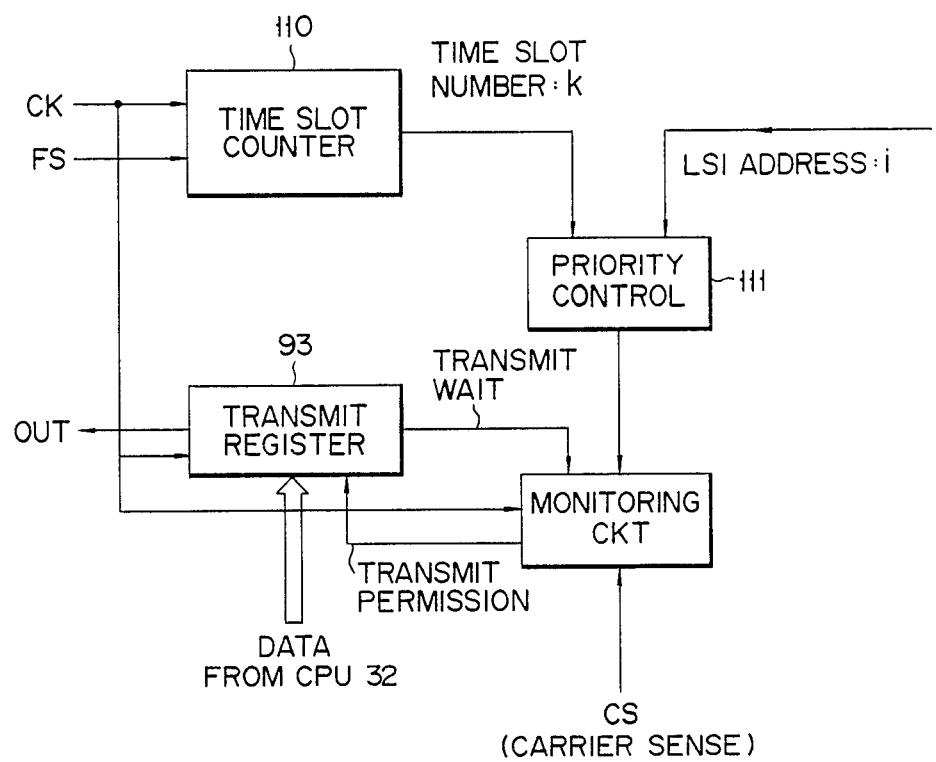
FIG. 11 is a block diagram of an interface LSI according to the invention.

FIG. 11 shows an arrangement of a slave ILSI transmission controller according to the invention. Time slot counter 110 produces data representing time slot No. k in response to clock signal CK and frame sync signal FS. Priority controller 111 determines the possibility or impossibility of accessing and priority order, and produces priority order data in response to time slot No. k data and LSI address i. Transmission data to be transmitted from CPU 32 to LCPU card is loaded in transmitting register 93. In a standby state for transmission, controller 114 gives transmitting register 93 a transmission permission at a suitable timing in response to the priority order data from priority controller 111 and carrier sense signal CS.

More specifically, priority controller 111 determines the priority order on the basis of the following logics.

(1) Time slot No. k and accessible LSI address i are related as follows:

$$i \bmod (j) = k \bmod (j)$$

where j denotes a parameter.

(2) LSI addresses of LSIs having a priority in time slot k are:

(I) 1st order: k (inclusive of 0 to N−1)
(II) 2nd order: (k+j) modulo N
(III) 3rd order: (k+2j) modulo N
(IV) 4th order: (k+3j) modulo N where N represents the number of time slots.

Figure 12:
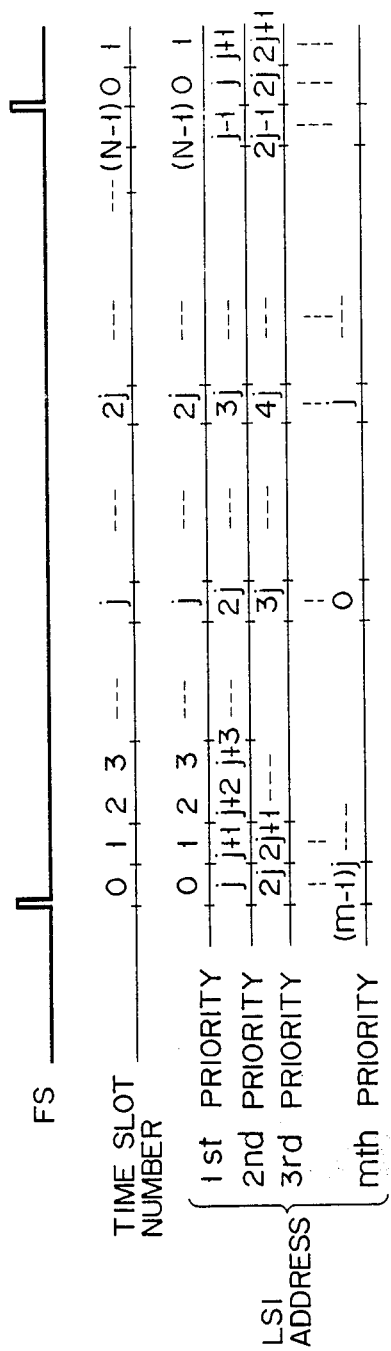
FIG. 12 is a diagram for explaining the priority of ILSIs in time slots for transmission of control data.
Figures 13, 14:
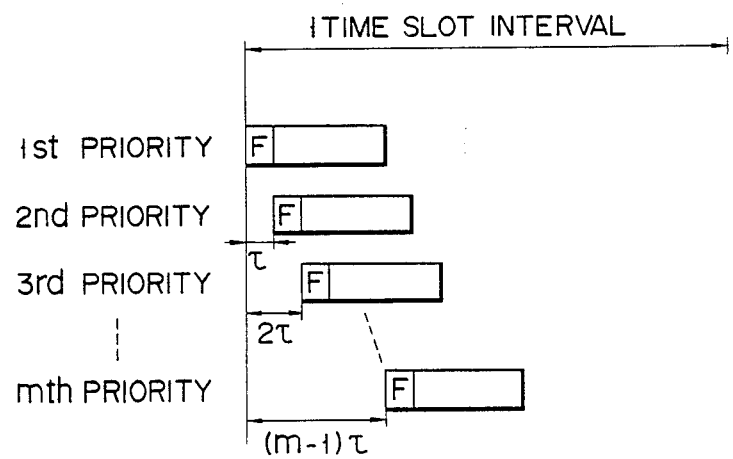
FIG. 13 shows a priority table.
FIG. 14 is a view for explaining data transmission of a plurality of ILSIs entitled to transmit data in one time slot.

If the maximum number of priority orders is m and N is N=m×j, m LSIs are accessible in each time slot. This relation is shown in FIG. 12. For example, an LSI having the first priority in time slot 0 has address 0. The second to m-th priorities are given to LSIs having addresses j, 2j, ..., (m - 1)j, respectively. FIG. 13 shows a priority table. Each LSI has the first priority in its allotted time slot. The LSIs having addresses j to 2j - 1 have the second priority in respective time slots 0 to j - 1. To readily realize the logics of this priority table with hardware, it is desirable to set N and j to powers of 2, e.g., N=32 (=$2^5$) and j=8 (=$2^3$).

Now, monitoring control will be described. FIG. 14 shows a relation between the priority of ILSIs and signal transmission timing. According to the invention, the LSIs having the first priority are arranged to transmit a signal in synchronism with the start of the respective time slots, and the LSIs having the second to m-th priorities in each time slot are arranged to transmit a signal after delay times of $\tau$ to $(m - 1)\tau$ from the start of the time slot. The time delay is provided for monitoring the control data highway. For example, the LSI having the third priority monitors the control data highway for a period of $2\tau$ and transmits data after confirming that the two LSIs having the higher priority orders are not transmitting data. In FIG. 14, F denotes a flag or header indicating the start of transmission data. It has a 2-bit pattern of "10", for instance. $\tau$ corresponds to the length of the flag.

Now, the arrangements shown in FIGS. 9 and 11 will be described in greater detail with reference to FIGS. 15 to 21.

Figure 15:
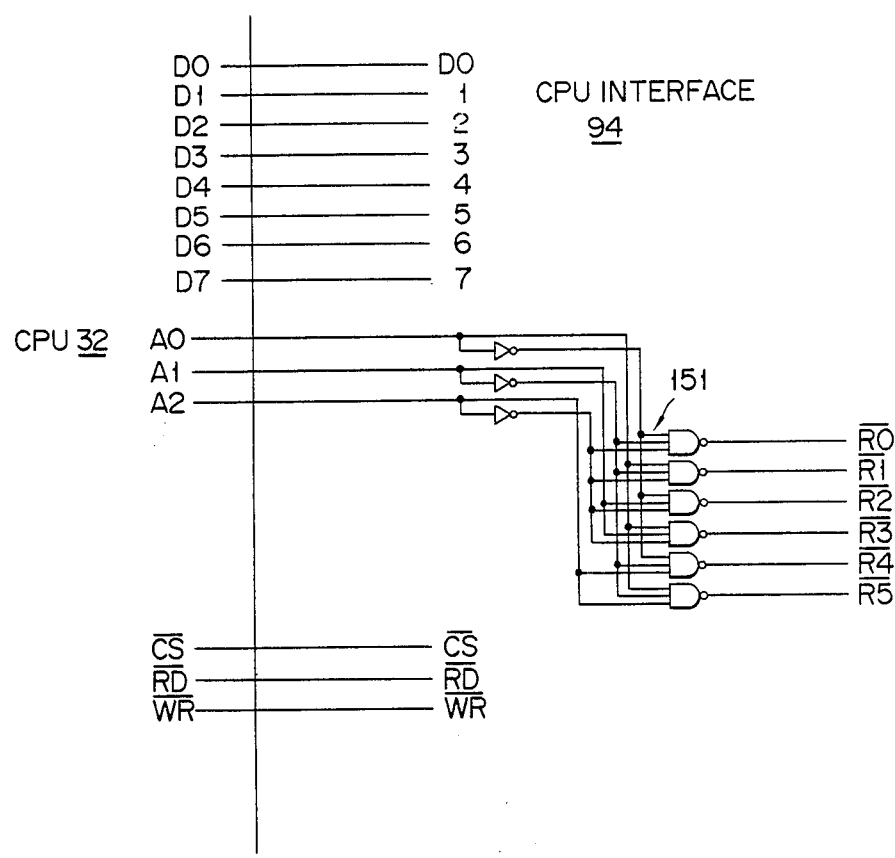
FIG. 15 shows a CPU interface shown in FIG. 9.

FIG. 15 shows CPU interface 94. CPU interface 94 is coupled to CPU 32 through 8-bit data bus D0 to D7. CPU 32 supplies internal register address signals A0 to A2 to ILSI 34. These signals are decoded in decoder 151 into register selection signals $\overline{R0}$ to $\overline{R5}$. CPU 32 further supplies chip select signal $\overline{WR}$, read control signal $\overline{CS}$ and write control signal $\overline{RD}$ to ILSI 34.

Figure 16:
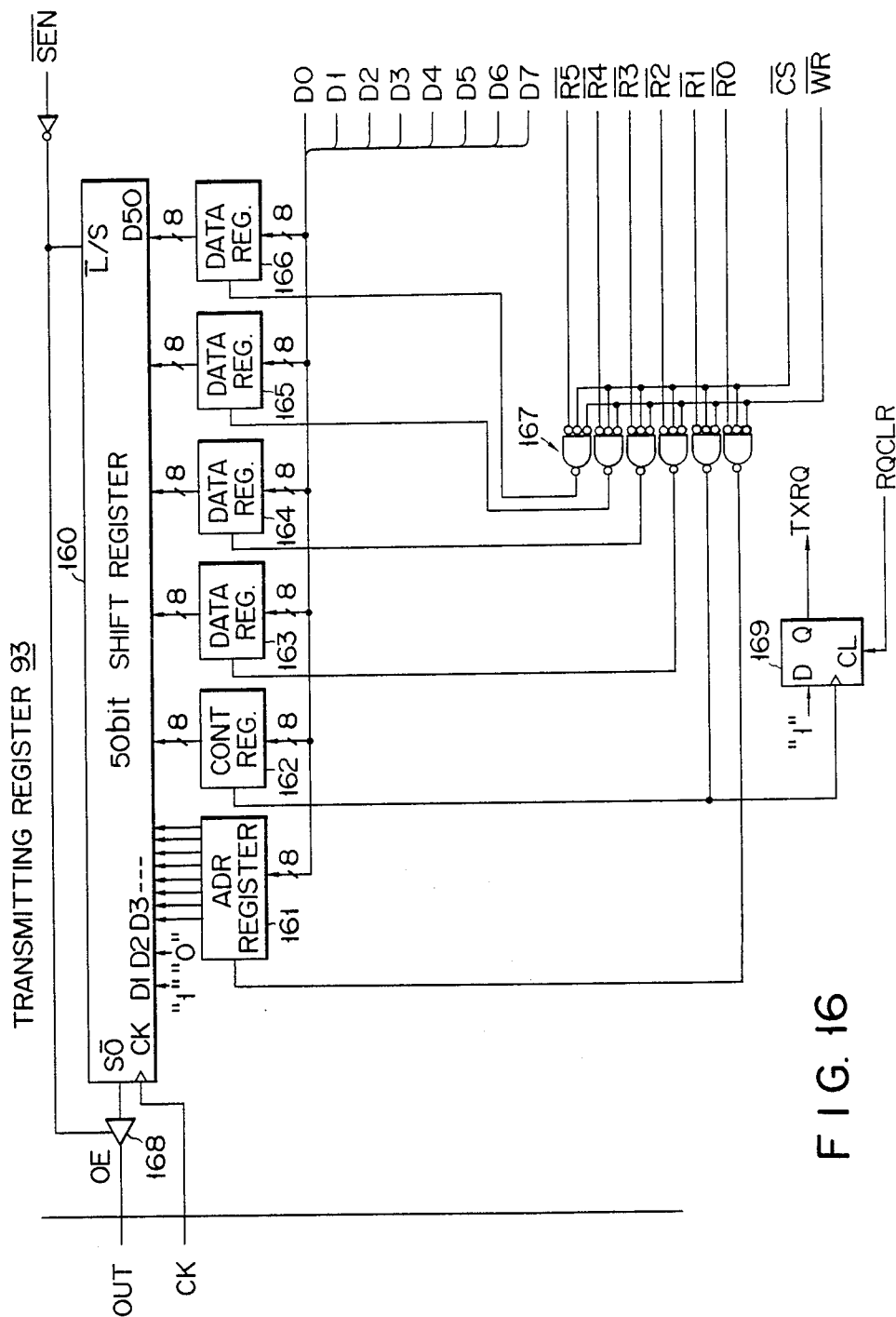
FIG. 16 shows an arrangement of a transmitting register shown in FIG. 11.

Referring to FIG. 16, reference numeral 160 designates a 50-bit transmitting shift register. Data "1" and "0", showing a header, are fed to inputs D1 and D2 of the shift register. Outputs of 8-bit shift registers 161 to 166 are fed to inputs D3 to D50. The inputs to shift registers 161 to 166 are commonly coupled to data buses D0 to D7. Shift registers 161 to 166 progressively latch 8-bit data supplied from CPU 32 through the data bus in response to signals from decoder 167, to which register selection signals $\overline{R0}$ to $\overline{R5}$, chip select signal $\overline{CS}$ and write control signal $\overline{WR}$ are supplied. Data latched in shift registers 161 to 166 are loaded into transmitting shift register 160. The output data in shift register 160 is sent to the control data highway through tri-state output buffer 168 which is responsive to transmission enable signal $\overline{SEN}$. The latch signal for register 162 is coupled to a clock input terminal of D type flip-flop (F/F) 169. Data "1" is supplied to a data input terminal of F/F 169. Thus, after an instant when data is latched in shift register 162, at which time address data has already been latched in register 161, F/F 169 supplies transmission ready signal TXRQ to monitoring controller 112 shown in FIG. 19. F/F 169 is cleared by clear signal RQCLR from the monitoring controller. The clear signal is generated every time 50 clock pulses are counted.

Figure 17:
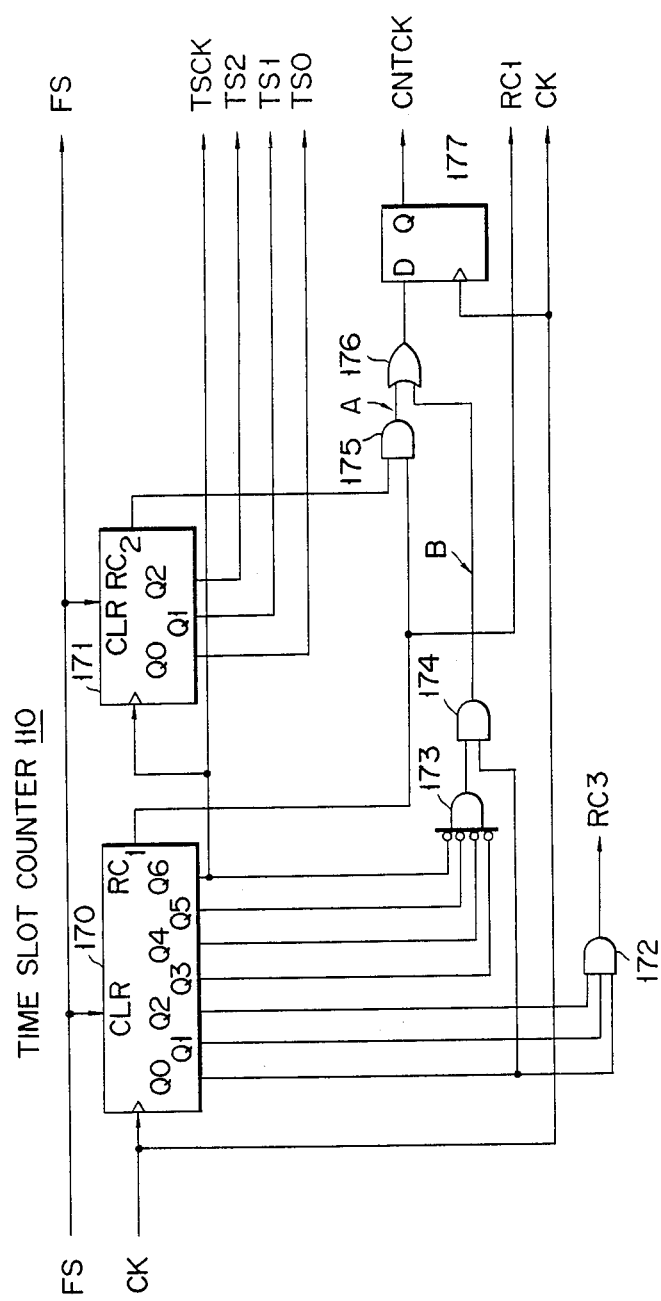
FIG. 17 shows an arrangement of a time slot counter shown in FIG. 11.
Figure 20:
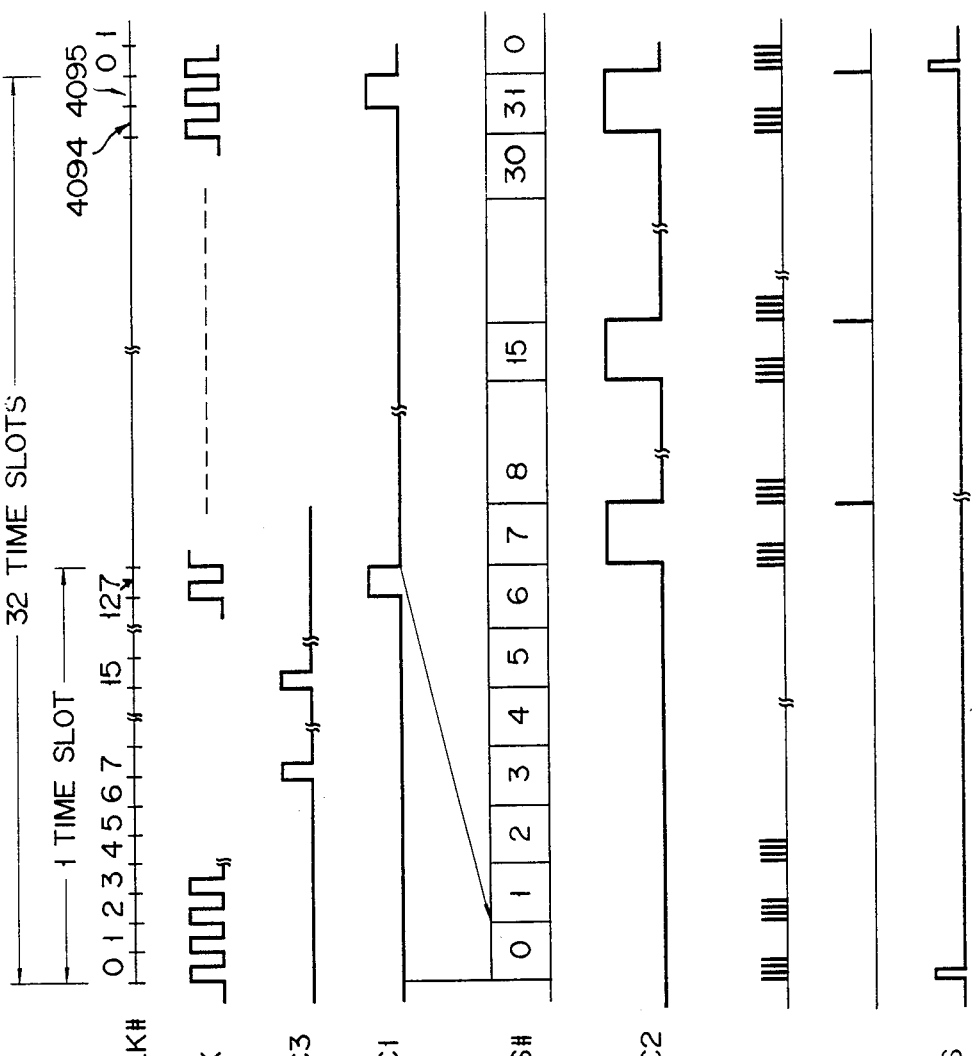
FIG. 20 is a timing chart for explaining the operation of the time slot counter shown in FIG. 17.

FIG. 17 shows time slot counter 110. The counter 110 comprises 7-bit binary counter 170, which counts clock signal CK and is cleared by frame sync signal FS. Counter 170 produces an output signal RC1 every time it counts $2^7 = 128$ clock pulses corresponding to the time interval of one slot, as shown in the time chart of FIG. 20. Counter 170 has bit output terminals Q0 to Q6. Bit output terminal Q6 is connected to a clock input terminal of 3-bit binary counter 171, which is cleared by frame sync signal FS. Counter 171 produces an output signal RC2 every time it counts 8 time slots. As shown in FIG. 20, counter 171 produces an output signal RC2, which is held at high level for one time slot, every time it counts the 7th, 15th, ... 31st time slots in 0 to 31st time slots.

Bit outputs Q0 to Q2 of counter 170 are coupled to AND gate 172, which provides an output signal RC3 every time 8 clock pulses CK are counted. Bit outputs Q3 to Q6 of counter 170 are coupled to gate 173, the output of which and bit output Q0 are coupled to AND gate 174 to produce an output signal B shown in FIG. 20. Output signal B corresponds to four alternate clock pulses in the first eight clock pulse period in each time slot. Outputs RC1 and RC2 of counters 170 and 171 are coupled to AND gate 175. AND gate 175 generates a signal A, which goes to "1" in synchronism with the last clock pulse of each of the 7th, 15th, 23rd and 31st time slots in the 0 to 31st time slots, as shown in FIG. 20.

The outputs of AND gates 174 and 175 are coupled through OR gate 176 to a D input terminal of D type F/F 177. F/F 177 supplies an output signal CNTCK to monitoring controller 112 in response to clock signal CK (FIG. 19). Bit outputs Q0 to Q2 of counter 171 represents one of 8 (=j) time slots in 4 (=m) time slot groups in 32 (=N) time slots. Bit outputs Q0 to Q2 of counter 171 are coupled as signals TS0 to TS2 to priority controller 111 shown in FIG. 18.

Figure 18:
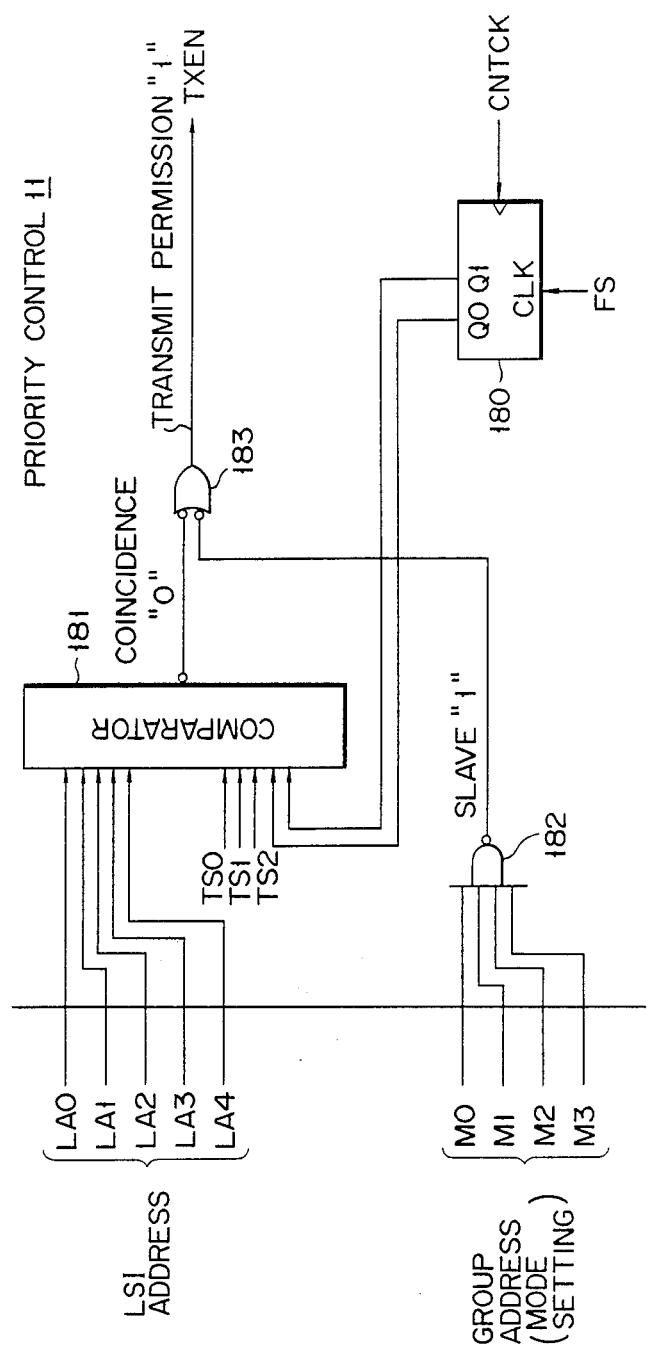
FIG. 18 shows an arrangement of a priority controller shown in FIG. 11.
Figure 19:
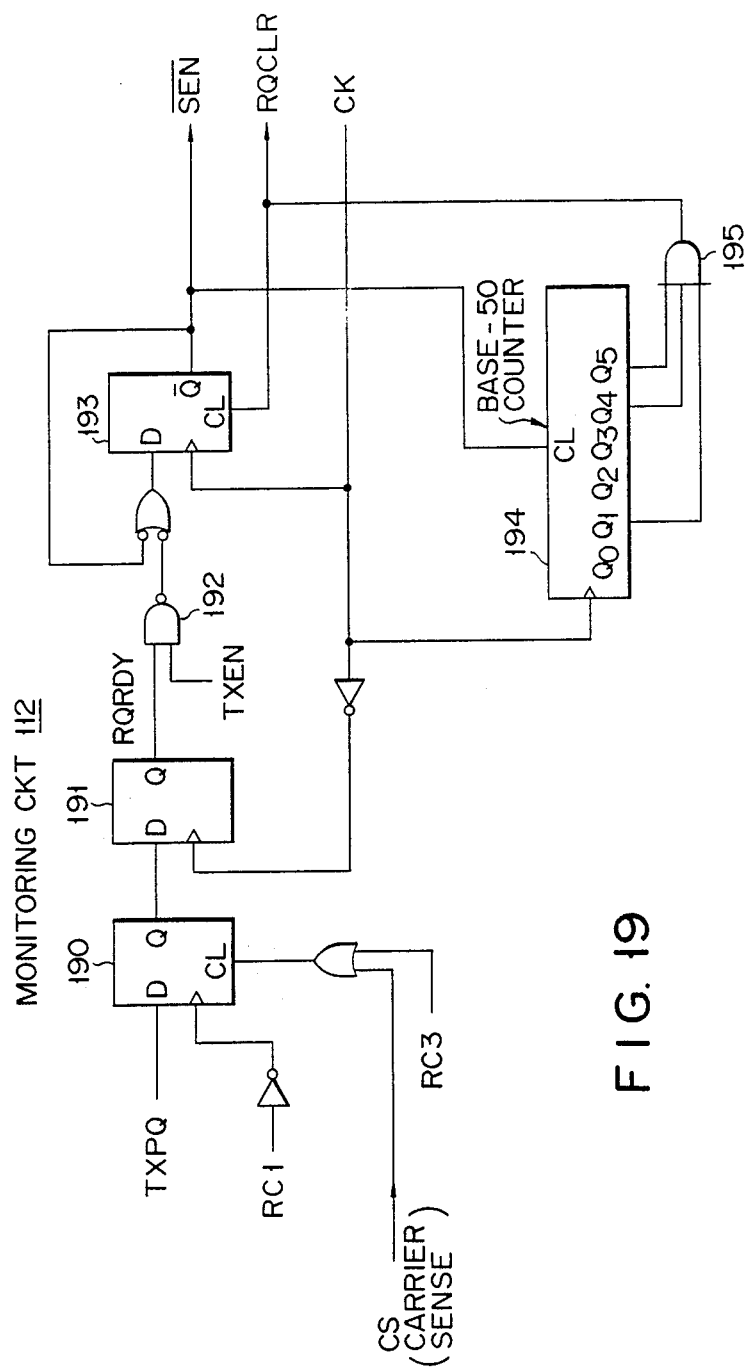
FIG. 19 shows an arrangement of a monitoring control circuit shown in FIG. 11.

Referring to FIG. 18, priority controller 111 comprises 2-bit binary counter 180, which receives as clock input output signal CNTCK of F/F 177 in time slot counter 110 and is cleared by frame sync signal FS. This counter has bit output terminals Q0 and Q1. Address comparator 181 is provided which compares LSI address data A0 to A4 which is peculiar to each LSI with a combination of signal TS0 to TS2 from time slot counter 110 and bit outputs Q0 and Q1 of counter 180. Comparator 181 provides a low level output when it detects a coincidence. Group address data or operation mode setting data M0 to M3 are coupled to NAND gate 182. For the master mode, data M0 to M3 are each set to "1". Since the slave mode is set for the line/trunk card ILSI, the output of NAND gate 182 is "1" at all time. The outputs of comparator 181 and NAND gate 182 are coupled to gate 183. Thus, when address comparator 181 in the ILSI in the slave mode detects a coincidence of address data, gate 183 generates a transmission permission signal TXEN of "1", which is supplied to monitoring controller 112.

Figure 21:
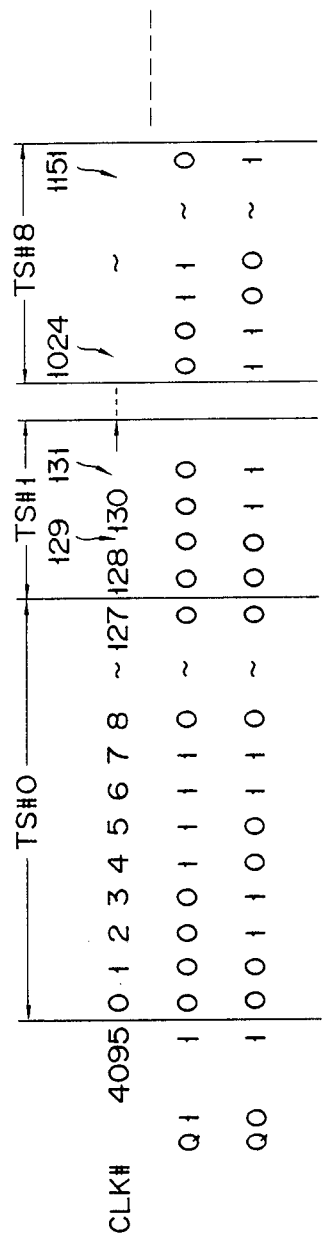
FIG. 21 is a diagram for explaining the operation of the priority controller shown in FIG. 18.

The states of bit outputs Q0 and Q1 of counter 180 are changed in response to signal CNTCK as shown in FIG. 21. In each of time slots TS#0 to TS#31, they are changed according to signal B. In time slots TS#8, TS#15, TS#23 and TS#31, they are changed according to signal A as well. In each time slot, bit outputs Q0 and Q0 are changed in four ways at a time interval corresponding to 2 bits in a period of 0 to 7th clock pulses. This means that in each time slot four ILSIs are given an access right and also given a monitoring time depending on the flag length shown in FIG. 14 according to the priority of the ILSIs.

FIG. 19 shows monitoring controller 112. Transmission ready signal TXRQ from transmitting register 93 shown in FIG. 16 is supplied to a data input terminal of D type F/F 190, which is clocked by an inverted signal of signal PC1 generated from time slot counter 110 every time one time slot has passed. This F/F is cleared by carrier sense signal CS or signal RC3 which is generated every time 8 clock pulses (corresponding to a data length of one byte) arrive in each time slot. Output Q of F/F 190 is coupled to a data input terminal of D type F/F 191 which is clocked by an inverted signal of clock signal CK. The output of F/F 191 is coupled together with transmission permission signal TXEN from priority controller 111 to NAND gate 192. The output of NAND gate 192 is coupled to a data input terminal of D type F/F 193 which is clocked by clock signal CK. F/F 193 produces at its output terminal $\bar{Q}$ transmission enable signal $\overline{SEN}$, which is coupled to output buffer 168 shown in FIG. 16. When transmitting register 93 is in transmission ready state (TXRQ=1) and transmission permission signal TXEN becomes "1", transmission enable signal $\overline{SEN}$ enables output buffer 168, so that data loaded in transmitting register 160 is sent out to the control data highway.

Monitoring controller 112 further comprises base-50 counter 194 for counting clock signal CK. Outputs Q1, Q4 and Q5 of counter 194 are coupled to AND gate 195. Counter 194 is cleared by output $\overline{SEN}$ of F/F 193 which enables transmission of the output data. When the transmission of 50-bit output data is completed, output RQCLR of AND gate 195 goes to "1" to clear F/F 193 and F/F 169 of transmitting register 93 shown in FIG. 16.

As described above, according to the invention one slave LSI is given at most m-time opportunities of transmission in one frame period, so that the transmission efficiency of the transmission line can be extremely improved compared with a normal time-slot transmission system. More specifically, in the prior art system a time period of nT, where T is the frame period, is required for n times of data transmission. In contrast, according to the invention, the same data transmission can be completed in a period of nT/m, unless there is any transmission request from other LSIs. Further, the system according to the invention is essentially free from collision of signals, that is, there is no need of collision detection, which requires very complicated control or re-transmission timing control.

The control data transmission system according to the invention is very well-suited for data transmission using a control data highway between a common controller and a line/trunk module of a private branch exchange for the following reasons: (a) The traffic of the private branch exchange is not so high, so that it is possible to make effective use of the transmission line by connecting a large number of slave LSIs to the control data highway. (b) It is possible to reduce the delay of transmission, even in case of concentration of transmission requests in a short period of time, without substantially increasing the transmission rate.

What is claimed is:

1. A data transmission system comprising:
   a plurality of data transmitting circuit means with different addresses allotted thereto;
   common data receiving circuit means; and
   common data transmission line means for coupling said plurality of data transmitting circuit means to said common data receiving circuit means, said common data transmission line means including a first transmission line through which a clock pulse signal determining the rate of data transmission is transmitted, a second transmission line through which a frame sync signal determining one frame period of time having a plurality of time slots and synchronized with said clock pulse signal is transmitted, and a third transmission line through which a data signal is transmitted from each of said data transmitting circuit means to said data receiving circuit means;
   said plurality of data transmitting circuit means each being responsive to said clock pulse signal, said frame sync signal and its own allotted address to transmit data to said third transmission line with a first priority in a time slot corresponding to its own allotted address in the frame period of time and to have a right to transmit data to said third transmission line with a priority of a lower order than said first priority in the other time slots, each of said data transmitting circuit means transmitting data after confirming that no data is being transmitted by data transmitting circuit means having a priority of a higher order than its own priority in a time slot, in which it is given a priority of a lower order than said first priority.

2. A data transmission system comprising:

a plurality of data transmitting circuit means with different addresses allotted thereto;

common data receiving circuit means; and common data transmission line means for coupling said plurality of data transmitting circuit means to said common data receiving circuit means, said common data transmission line means including a first transmission line through which a clock pulse signal determining the rate of data transmission is transmitted, a second transmission line through which a frame sync signal determining one frame period of time having a plurality of time slots and synchronized with said clock pulse signal is transmitted, and a third transmission line through which a data signal is transmitted from each of said data transmitting circuit means to said data receiving circuit means;

said plurality of data transmitting circuit means each including time slot counting means for counting time slots in response to said clock pulse signal and said frame sync signal to provide data representing a time slot number k, and priority determining means responsive to the time slot number k data and an address i allotted to itself for determining priority orders to transmit data to said third transmission line in a plurality of time slots, said priority determining means being arranged to determine the priority orders as follows:

(A) i modulo (j) = k modulo (j)

where j represents a parameter, and (B) addresses of data transmitting circuit means having a priority in the time slot whose number is k are (1) first priority: k
(2) second priority: $(k+j)$ modulo N
(3) third priority: $(k+2j)$ modulo N
(4) fourth priority: $(k+3j)$ modulo N
(m) m-th priority: $\{k+(m-1)j\}$ modulo N where N is the number of time slots in one frame period, m is the maximum number of data transmitting circuit means capable of data transmission in one time slot, and m and j are related by $N = m \times j$.

3. The data transmission system according to claim 2, wherein N, m and j are each a power of 2.

4. The data transmission system according to claim 3, wherein $N = 32$, $m = 4$, and $j = 8$.

5. A data transmission system comprising:

a plurality of data transmitting circuit means having different addresses allotted thereto;

common data receiving circuit means; and common data transmission line means for coupling said plurality of data transmitting circuit means to said common data receiving circuit means, said common data transmission line means including a first transmission line through which a clock pulse signal determining the rate of data transmission is transmitted, a second transmission line through which a frame sync signal determining one frame period of time having a plurality of time slots and synchronized with said clock pulse signal is transmitted, and a third transmission line through which a data signal is transmitted from each of said data transmitting circuit means to said common data receiving circuit means;

each of said plurality of said data transmitting circuit means including time slot counting means responsive to said clock pulse signal and said frame sync signal for counting time slots in one frame period of time to provide data representing a time slot number; priority control circuit means responsive to the time slot number data provided by said time slot counting means and address data representing an address allotted to itself for generating a data transmission permit signal in a plurality of time slots in which a priority to transmit a data signal to said third transmission line is assigned to itself; transmitting register circuit means for storing a data signal to be transmitted to said third transmission line, said transmitting register circuit means issuing a transmission ready signal upon completion of storing said data signal into said transmitting register means; and monitoring control circuit means coupled to said priority control circuit means, said transmitting register circuit means and said third transmission line for monitoring said third transmission line and enabling said transmitting register circuit means to transmit said data signal to said third transmission line in response to said transmission permit signal from said priority control circuit means and said transmission ready signal from said transmitting register circuit means when a data signal is not transmitted to said third transmission line from other transmitting circuit means.

6. The data transmission system according to claim 5, wherein said monitoring control circuit means is arranged to monitor said third transmission line in each of the time slots in which a priority to transmit a data signal is assigned during a period of time corresponding to a priority order assigned to itself.

* * * * *